United States Patent [19]

Kamiyanagi et al.

[11] Patent Number: 5,707,910

[45] Date of Patent: Jan. 13, 1998

[54] ALUMINA-MAGNESIA OXIDE, METHOD OF MAKING THE SAME, AND FINE PULVERULENT BODY OF THE SAME

[75] Inventors: Tokio Kamiyanagi; Takayuki Fujita; Noriho Harumiya, all of Nagano-ken, Japan

[73] Assignee: Taimei Kagaku Kogyo Kabushiki Kaisha, Nagano-ken, Japan

[21] Appl. No.: 623,165

[22] Filed: Mar. 28, 1996

[30] Foreign Application Priority Data

Mar. 28, 1995 [JP] Japan .................................. 7-096031

[51] Int. Cl.[6] .......................... C04B 35/04; C04B 35/10; C04B 38/00
[52] U.S. Cl. ........................ 501/120; 501/118; 501/119; 501/80
[58] Field of Search ................... 501/80, 118, 119, 501/120

[56] References Cited

U.S. PATENT DOCUMENTS

| | | | |
|---|---|---|---|
| 3,950,175 | 4/1976 | Lachman et al. | 501/80 |
| 4,547,468 | 10/1985 | Jones et al. | 501/33 |
| 4,698,317 | 10/1987 | Inoue et al. | 501/9 |
| 4,871,693 | 10/1989 | Inoue et al. | 501/9 |
| 5,021,373 | 6/1991 | Mitchell et al. | 501/119 |

FOREIGN PATENT DOCUMENTS

| | | |
|---|---|---|
| 0295389 | 12/1988 | European Pat. Off. . |
| 0371211 | 6/1990 | European Pat. Off. . |
| 50-839 | 1/1975 | Japan . |
| 143712 | 9/1989 | Japan . |
| 2184715 | 7/1987 | United Kingdom . |

OTHER PUBLICATIONS

Suyama et al, Ceramics International, vol. 8, No. 1, pp. 17–21 (1982), No month.

Vollath, Journal of Materials Science, vol. 25, No. 4, pp. 2227–2232 (1990), Apr.

*Primary Examiner*—Mark L. Bell
*Assistant Examiner*—Louis M. Troilo

[57] ABSTRACT

An object of the present invention is to provide an alumina-magnesia oxide which can be fine pulverulent bodies by pulverizing. In the alumina-magnesia oxide of the present invention includes: 70–73 WT % of alumina component, which is converted into alumina ($Al_2O_3$); and 27–30 WT % of magnesia component, which is converted into magnesia (MgO). The alumina-magnesia oxide is formed into a pulverulent body, which is a hollow grain having loosed bulk density of 0.15 g/cm$^3$ or less and average grain diameter of 10 μm or more.

8 Claims, 2 Drawing Sheets

ALUMINA-MAGNESIA OXIDE, METHOD OF MAKING THE SAME, AND FINE PULVERULENT BODY OF THE SAME

BACKGROUND OF THE INVENTION

The present invention relates to an alumina-magnesia oxide, a method of making the alumina-magnesia oxide, and a fine pulverulent body of the alumina-magnesia oxide, more precisely relates to an alumina-magnesia oxide including 70–73 WT % of alumina component, which is converted into alumina ($Al_2O_3$) and 27–30 WT % of magnesia component, which is converted into magnesia (MgO), a method of making said oxide, and a fine pulverulent body of said oxide, which is formed by pulverizing said oxide.

An alumina-magnesia oxide having a spinel-type crystal form is chemically and physically stable. Porous alumina-magnesia oxides are used for catalytic agents, support bodies of catalytic agents, adsorbents, molecular sieves, filters, etc.

A porous body of the alumina-magnesia oxide was disclosed in Japanese Patent Publication Gazette No. 1-43712. The porous body is made by a spray roasting method: spraying an aqueous solution of an aluminum salt and magnesium salt in an oxidizing atmosphere at the temperature of 800° C. or more; and roasting the mist of said aqueous solution therein.

By the spray roasting method disclosed in said gazette, porous pulverulent bodies of the alumina-magnesia oxide can be made.

In the case of using porous pulverulent bodies for catalytic agents, etc., the specific surface areas of the porous pulverulent bodies should be made great, so that their diameters can be made as small as possible.

Alumina magnesia oxide can be used for fireproof materials and construction materials due to its heat-resisting property and corrosion-resisting property. In this case too, the diameter of the pulverulent bodies should be made as small as possible so as to make their toughness greater by densification.

In said spray roasting method, the mist of the aqueous solution should be fine so as to make the diameter of the pulverulent bodies smaller. But the degree of fineness of the mist is limited by the viscosity of the aqueous solution, etc., so the pulverulent bodies should be made smaller by pulverizing.

However, we have known that it is very difficult to make pulverulent bodies, which have been made by the spray roasting method, fine by pulverizing.

SUMMARY OF THE INVENTION

An object of the present invention is to provide an alumina-magnesia oxide which can be made into fine pulverulent bodies by pulverizing, a method of making said alumina-magnesia oxide, and a fine pulverulent body made by said method.

The inventors of the present invention have studied to achieve the object. By the result of their study, the fine pulverulent bodies of the alumina-magnesia oxide can be made by the steps of: making pulverulent bodies of the alumina-magnesia oxide whose hollow rate can be made as great as possible, i.e., hollow grains whose loosed bulk density is made as small as possible and whose average diameter is made as great as possible, by the spray roasting method; and pulverizing said pulverulent bodies of said hollow grains.

Namely, the alumina-magnesia oxide of the present invention includes:

70–73 WT % of alumina component, which is converted into alumina ($Al_2O_3$); and 27–30 WT % of magnesia component, which is converted into magnesia (MgO), wherein the alumina-magnesia oxide is formed into a pulverulent body, which is a hollow grain having loose bulk density of 0.15 $g/cm^3$ or less and average grain diameter of 10 μm or more.

In the alumina-magnesia oxide, the alumina-magnesia oxide may mainly have the spinel-type crystal form.

The method of making the alumina-magnesia oxide, comprises the steps of:

spraying an aqueous solution of an aluminum salt and a magnesium salt in an oxidizing atmosphere; and roasting the sprayed aqueous solution so as to form an alumina-magnesia oxide mainly having the spinel-type crystal form, wherein their aqueous solution is a basic aqueous solution including the aluminum salt and magnesium salt in which the total concentration of the aluminum salt and magnesium salt, which is converted into oxides, is 12–20 WT %, and wherein the alumina-magnesia oxide is formed into a pulverulent body, which is a hollow grain.

In the method, the basic aqueous solution may satisfy the following formulas:

$$Mg/Al=0.46-0.55;$$

and $$Cl/Al=1.3-3.7.$$

In the method, the aluminum salt may be poly aluminum chloride.

The fine alumina-magnesia oxide pulverulent body of the present invention is formed by pulverizing a hollow grain of said alumina-magnesia oxide, wherein the diameter of the fine pulverulent body is 1 μm or less.

In the fine alumina-magnesia oxide pulverulent body, loose bulk density of the pulverulent body may be 0.5 $g/cm^3$ or more. If the fine pulverulent body is used as a ceramic material, a fine sintered product, which is made of said ceramic material, can be made by burning.

In the present invention, by employing the basic aqueous solution for spray roasting, the viscosity of the aqueous solution can be limited, so that the concentration of the aluminum salt and the magnesium salt therein can be higher than that in the conventional method.

By the spray roasting method and with the aqueous solution in which the concentration of the aluminum salt and the magnesium salt is high, the pulverulent bodies of the alumina-magnesia oxide, which are hollow grains having high hollow rate, can be made.

Since the walls of the hollow grains having high hollow rate are thin, they can be easily made fine by pulverizing.

The detailed mechanism of forming the alumina-magnesia oxide hollow grains having a high hollow rate is not clearly known, but we presume the reason to be: the surface energy of the basic aqueous solution in which the concentration of the aluminum salt and the magnesium salt is high is small, so that shrinkage of the mist of said aqueous solution is restricted.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Figure 1:
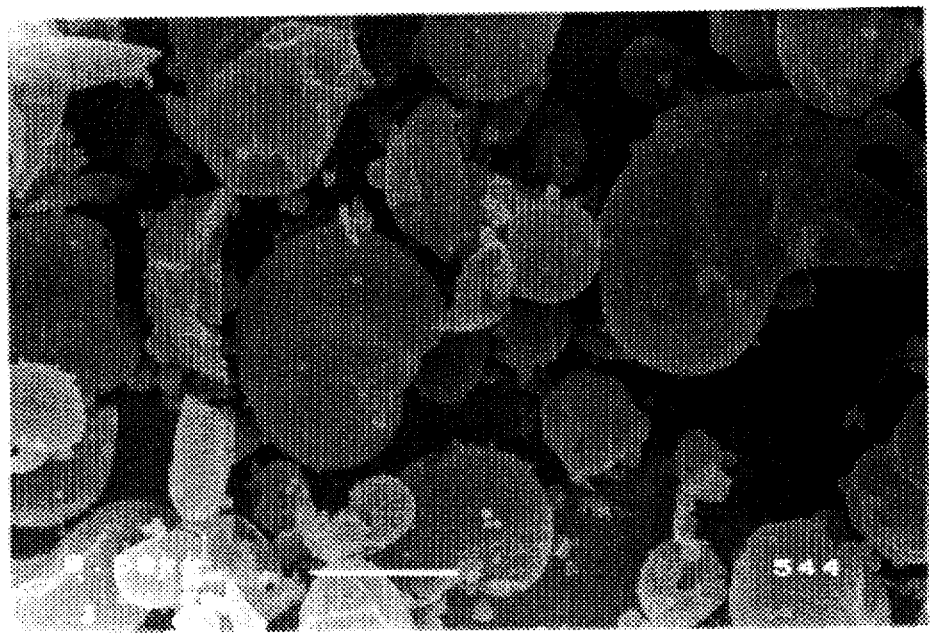
FIG. 1 is an enlarged view of the pulverulent bodies of the alumina-magnesia oxide of the present invention, which is made by the spray roasting method, the enlarged view is seen by a scanning electron microscope (500 magnifications)

Preferred embodiments of the present invention will now be described in detail with reference to the accompanying drawings.

The alumina-magnesia oxide of the present invention contains pulverulent bodies, which include 70-73 WT % of alumina component, which is converted into alumina ($Al_2O_3$), and 27-30 WT % of magnesia component, which is converted into magnesia (MgO).

In the alumina-magnesia oxide, the alumina-magnesia oxide mainly has a spinel-type crystal form.

In the present invention, grains constituting the pulverulent bodies are hollow grains. To pulverize the pulverulent bodies or the hollow grains into fine pulverulent bodies, the hollow grains are required to have loose bulk density of 0.15 g/cm$^3$ or less (preferably 0.02-0.10 g/cm$^3$), and average grain diameter of 10 μm or more (preferably 12-40 μm).

If the hollow grains have a loose bulk density of more than 0.15 g/cm$^3$ or the average grain diameter of less than 10 μm, it is very difficult to pulverize the pulverulent bodies into the fine pulverulent bodies.

The pulverulent bodies of the present invention are made by a spray roasting method of: spraying an aqueous solution of aluminum salt and magnesium salt in oxidizing atmosphere; and roasting the sprayed aqueous solution therein.

It is important that the aqueous solution is a basic aqueous solution including aluminum salt and magnesium salt in which the total concentration of the aluminum salt and magnesium salt, which are converted into oxides, is 12-20 WT %.

In the case of employing an aqueous solution of a normal aluminum salt, e.g., aluminum chloride, and a normal magnesium salt, e.g., magnesium chloride, the viscosity of this aqueous solution is higher than that of a basic aqueous solution of the same amount of mere aluminum salt and magnesium salt, so that the aqueous solution should be heated so as to make the viscosity lower.

Further, in the aqueous solution of the normal salts, if the total concentration of the aluminum salt and the magnesium salt therein, which is converted into oxides, is 12 WT % or more, a homogeneous solution cannot be made so that the oxide-converted concentration of the solution must be lower than 12 WT %.

As described above, even if the aqueous solution of the normal salt having the oxide-converted concentration of lower than 12 WT % is sprayed and roasted, the pulverulent bodies made of the hollow grains having high hollow rate cannot be formed. In the present invention, basic aluminum salts, e.g., poly aluminum chloride, may be employed as the aluminum salt. The poly aluminum chloride disclosed in Japanese Patent Publication Gazette No. 50-836, for example, may be preferably employed.

On the other hand, magnesium chloride (anhydride salt, hydrate salt), magnesium hydroxide, magnesium carbonate, etc. may be employed as the magnesium salt, which is employed together with the aluminum salt.

In the basic aqueous solution of the aluminum salt and the magnesium salt, the poly aluminum chloride (the basic aluminum salt) and the magnesium chloride, etc. (the normal magnesium salt) simultaneously satisfy following molar ratio formulas F1 and F2.

$$Mg/Al=0.46-0.55, \quad F1$$

and $$Cl/Al=1.3-3.7. \quad F2$$

If the molar ratio of Cl/Al=4, the aluminum salt and the magnesium salt are normal salts.

Note that, a chloride ion (Cl$^-$) is given attention in the formulas, but a nitrate ion (NO$_3$-), a sulfate ion (SO$_4^{2-}$), etc. may be given attention instead of the chloride ion.

In the present invention, the basic aqueous solution including prescribed amount of the aluminum salt and the magnesium salt is sprayed and roasted. The spray roasting may be executed under ordinary conditions, e.g., spraying the basic aqueous solution (20 cps or less at the temperature of 20° C.) and roasting the mist of the same in the oxidizing atmosphere in which the temperature is maintained between 800°-1,000° C.

Figure 2:
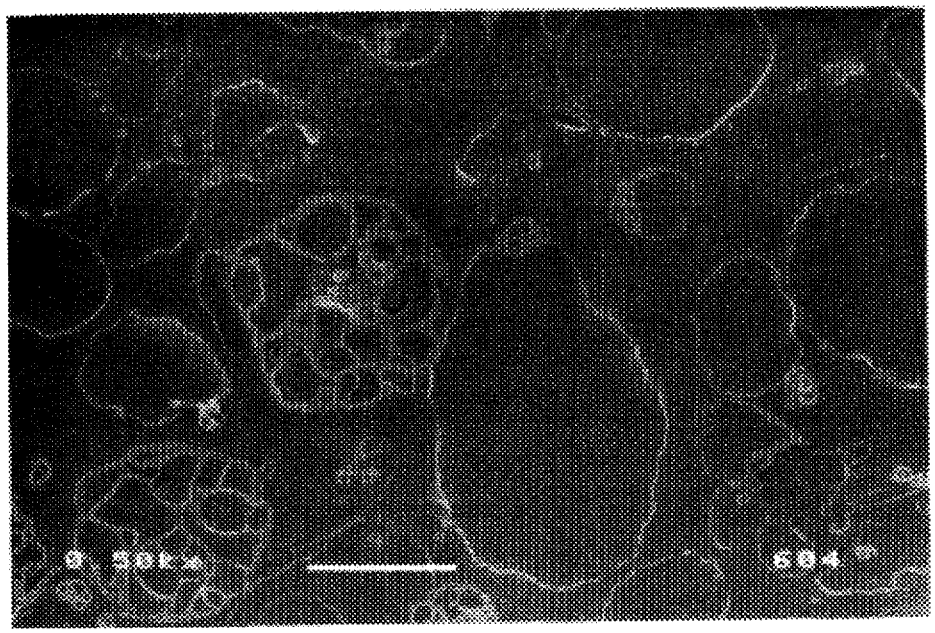
FIG. 2 is an enlarged view showing sectional faces of the pulverulent bodies shown in FIG. 1, the enlarged view is seen by the scanning electron microscope (500 magnifications)

Grain shapes of the pulverulent bodies made by the above described spray roasting method are shown in FIGS. 1 and 2. FIG. 1 is an enlarged view of the pulverulent bodies (an embodiment), which is made under a condition No. 3 of TABLE-2, and the enlarged view is a microphotograph taken by a scanning electron microscope (500 magnifications); FIG. 2 is an enlarged view showing sectional faces of the pulverulent bodies shown in FIG. 1, the enlarged view is a microphotograph taken by the scanning electron microscope (500 magnifications).

Figure 3:
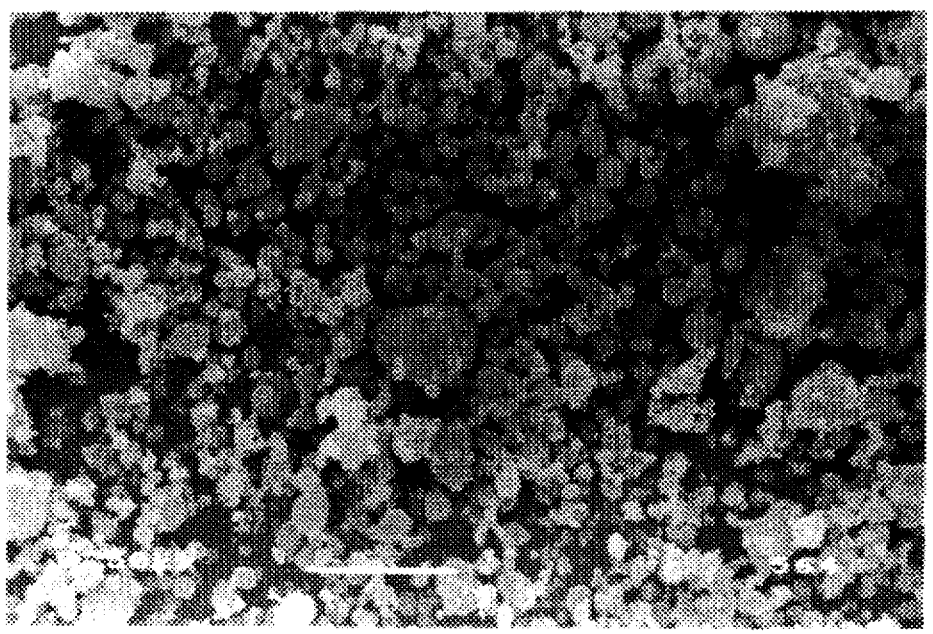
FIG. 3 is an enlarged view of the pulverulent bodies of the alumina-magnesia oxide, which is made by the spray roasting method in which the aqueous solution is not in the limitation of the present invention, the enlarged view is seen by the scanning electron microscope (500 magnifications)
Figure 4:
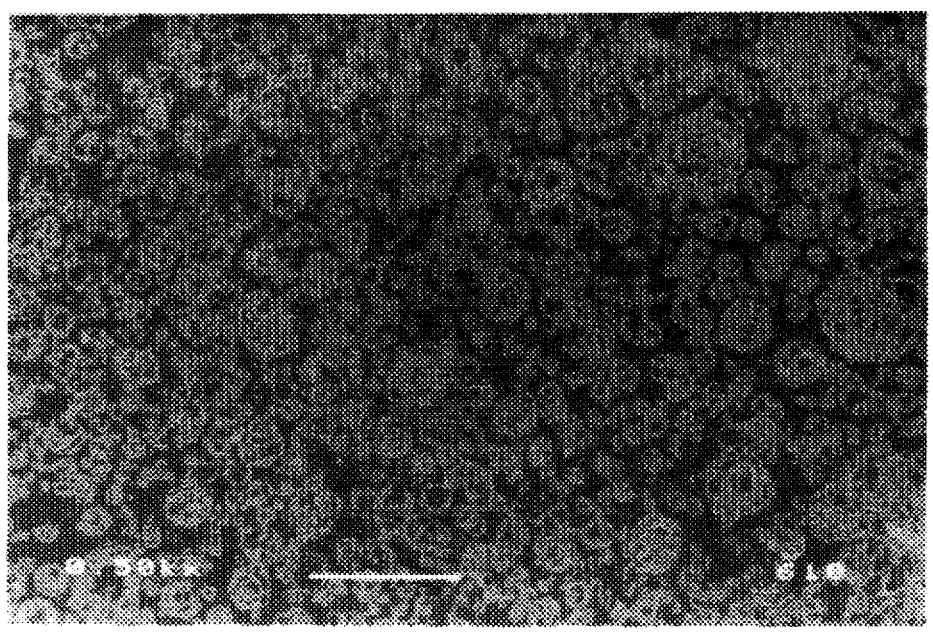
FIG. 4 is an enlarged view showing sectional faces of the pulverulent bodies shown in FIG. 3, the enlarged view is seen by the scanning electron microscope (500 magnifications).

On the other hand, FIG. 3 is an enlarged view of the pulverulent bodies (a comparative example), which is made under a condition No. 4 of TABLE-2, i.e., the total oxide-converted concentration of the aluminum salt and the magnesium salt in the normal salt aqueous solution is less than 12 WT % (11.8 WT %), and the enlarged view is a microphotograph taken by the scanning electron microscope (500 magnifications); FIG. 4 is an enlarged view showing sectional faces of the pulverulent bodies shown in FIG. 3, the enlarged view is a microphotograph taken by the scanning electron microscope (500 magnifications).

As clearly shown in FIGS. 1-4, the hollow rate of the grains of the inventive embodiment (FIGS. 1-2) is higher than that of the comparative example (FIGS. 3-4). And walls of the hollow grains of the inventive embodiment are quite thin.

By pulverizing the pulverulent bodies, which are made of the hollow grains having a high hollow rate and very thin walls, fine pulverulent bodies having diameter of 1 μm or less can be made easily.

The loose bulk density of the fine pulverulent bodies can be 0.5 g/cm$^3$ or more, so that they can packed with high concentration.

On the other hand, when the pulverulent bodies of the comparative example shown in FIGS. 3 and 4 are pulverized as well as the inventive embodiment, diameter of the pulverized bodies is about 1.4 μm, so they cannot be fine bodies having the diameter of 1 μm or less.

Note that, the pulverulent bodies are pulverized by an ordinary milling device, e.g., a ball mill.

In the present invention, the pulverulent bodies of the alumina-magnesia oxide having high hollow rate and very thin walls can be made. Thus, the fine pulverulent bodies of the alumina-magnesia oxide can be easily made by pulverizing the pulverulent bodies.

By employing the fine pulverulent bodies of the alumina-magnesia oxide as a ceramic material, products having high density and great toughness can be produced.

Successively, experimental examples of the present invention will be explained.

(Experiment 1)

The poly aluminum chloride is selected as the aluminum salt; the magnesium chloride is selected as the magnesium salt. They are dissolved in water to adjust Mg/Al molar ratio and Cl/Al molar ratio as shown in TABLE-1.

Temperature of the aqueous solution is changed and its viscosity according to the temperature is measured. The results are shown in TABLE-1.

TABLE 1

| NO. | AQUEOUS SOLUTION | 5° C. | 30° C. | 50° C. |
|---|---|---|---|---|
| 1 | Mg/Al = 0.50<br>Cl/Al = 2.8<br>CONCENTRATION 12% | 12.5 cps | 8.0 cps | 6.0 cps |
| 2 | Mg/Al = 0.51<br>Cl/Al = 2.0<br>CONCENTRATION 18% | 21.0 | 11.0 | 9.5 |
| 3 | Mg/Al = 0.50<br>Cl/Al = 1.6<br>CONCENTRATION 18% | 18.5 | 10.0 | 7.5 |
| 4 | Mg/Al = 0.50<br>Cl/Al = 4.0<br>CONCENTRATION 11.8% | 37.1 | 15.3 | 10.7 |

Note "No. 4" is a comparative example; and "CONCENTRATION" is the oxide-converted concentration.

As clearly shown in TABLE-1, in the basic aqueous solution No. 1–3 inventive (embodiments), the amount of the aluminum salt and the magnesium salt dissolved is greater than that of the aqueous solution No. 4 (the comparative example), which is an aqueous solution of the normal salt, but increasing the viscosity of the embodiments can be restricted.

(Embodiment 2)

The poly aluminum chloride and the magnesium chloride are dissolved to make the basic aqueous solution. The Mg/Al molar ratio, the Cl/Al molar ratio, and the viscosity and the concentration of the solution at temperature of 20° C. are shown as No. 1–3 of TABLE-2.

The basic aqueous solution is sprayed in a furnace to make the pulverulent bodies of the alumina-magnesia oxide. By an X-ray diffraction analysis, the pulverulent bodies mainly have a spinel-type crystal form, and their loose bulk density and average grain diameter are measured and also shown in No. 1–3 of TABLE-2.

Next, 700 g of the pulverulent bodies, which have been made by the spray roasting method, and a resin-coated ball having diameter of 20 mm and weight of 7.3 Kg were put in a plastic pot having capacity of 10 liters. The pot has been rotated for 10 hours with rotational speed of 50 rpm to pulverize. The average grain diameter and the loose bulk density of the fine pulverulent bodies pulverized are also shown in No. 1–3 of TABLE-2.

The aqueous solution of the normal salts, which are normal salts of the aluminum chloride and the magnesium chloride, are sprayed and roasted, and the pulverulent bodies (roasted) are pulverized as the comparative example. The Mg/Al molar ratio, the Cl/Al molar ratio, the viscosity and the concentration of the solution at temperature of 20° C., the average grain diameter and the loose bulk density of the pulverulent bodies, and the average grain diameter and the loose bulk density of the pulverized bodies are shown in No. 4 of TABLE-2.

Note that, by the X-ray diffraction analysis, the pulverulent bodies of the comparative example also mainly have a spinel-type crystal form.

TABLE 2

| | AQUEOUS SOLUTION | | | | ROASTED GRAINS | | | FINE GRAINS | |
|---|---|---|---|---|---|---|---|---|---|
| NO. | CONCEN-<br>TRATION<br>(wt %) | Mg/Al<br>MOLAR<br>RATIO | Cl/Al<br>MOLAR<br>RATIO | 20° C.<br>VISCOSITY<br>(cps) | ROASTING<br>TEMPERATURE<br>°C.) | LOOSED BULK<br>DENSITY/<br>$cm^3$) | AVERAGE<br>DIAMETER<br>μm | LOOSED BULK<br>DENSITY<br>($g/cm^3$) | AVERAGE<br>DIAMETER<br>μm |
| 1 | 16.0 | 0.50 | 2.6 | 18.3 | 800 | 0.09 | 12.7 | 0.56 | 0.4 |
| 2 | 16.0 | 0.50 | 2.0 | 10.1 | 1000 | 0.07 | 28.5 | 0.56 | 0.7 |
| 3 | 18.0 | 0.51 | 1.6 | 10.6 | 800 | 0.03 | 35.8 | 0.54 | 0.7 |
| 4 | 11.8 | 0.50 | 4.0 | 20.2 | 800 | 0.16 | 5.9 | 0.44 | 1.4 |

[Note]
"No. 4" is a comparative example;
"CONCENTRATION" is the oxide-converted concentration;
"AVERAGE DIAMETER of ROASTED GRAINS" is an average length of longitudinal length of 500 grains, which are measured by the scanning type electron microscope;
"AVERAGE DIAMETER of FINE GRAINS" is value of median diameter (by weight) ($d_{50\%}$) measured by a centrifugal particle size analyzer; and
"LOOSED BULK DENSITY" is measured on the basis of JIS-H-1902.

As clearly shown in TABLE-2, the pulverulent bodies of No. 1–3 (embodiments of the present invention) have greater average diameter, lower loose bulk density, higher hollow rate, and thinner walls with respect to the pulverulent bodies of No. 4 (the comparative example). With this structure, the pulverulent bodies of the embodiments or the hollow grains can be pulverized and easily formed into the fine pulverulent bodies or fine grains having the diameter of 1 μm or less.

Note that, as to the No. 3 and the No. 4 of TABLE-2, the microphotographs of the roasted pulverulent bodies taken by the scanning electron microscope (500 magnifications) are shown in FIGS. 1 and 3; the microphotographs of their sectional faces taken by the scanning electron microscope (500 magnifications) are shown in FIGS. 2 and 4.

The invention may be embodied in other specific forms without departing from the spirit of essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An alumina-magnesia oxide, being made from a basic aqueous solution including an aluminum salt comprising poly aluminum chloride and a magnesium salt comprising magnesium chloride wherein said basic aqueous solution satisfies the following molar ratio formulas:

$$Mg/Al=0.46-0.55;$$

and $$Cl/Al=1.3-3.7,$$

in which the total concentration of the aluminum salt and the magnesium salt, which are converted into oxides, is 12–20 WT %, said alumina-magnesia oxide, including:

70–73 WT % of an alumina component, which is converted into a alumina ($Al_2O_3$); and 27–30 WT % of a magnesia component, which is converted into magnesia (MgO), wherein said alumina-magnesia oxide is formed into a pulverulent body, which is a hollow grain having a loose bulk density of 0.15 g/cm$^3$ or less and an average grain diameter of 10 μm or more.

2. The alumina-magnesia oxide according to claim 1, wherein said alumina-magnesia oxide mainly has a spinel crystal form.

3. A method of making alumina-magnesia oxide, comprising of the steps of:

spraying an aqueous solution of an aluminum salt and a magnesia salt in an oxidizing atmosphere; and roasting said sprayed aqueous solution so as to form an alumina-magnesia oxide mainly having a spinel crystal form, wherein said aqueous solution is a basic aqueous solution including an aluminum salt and magnesium salt in which total concentration of the aluminum salt and magnesium salt, which are converted into oxides, is 12–20 WT %, and wherein said alumina-magnesia oxide is formed into a pulverulent body, which is a hollow grain.

4. The method according to claim 3, wherein the magnesium salt comprises magnesium chloride and the aluminum salt comprises poly aluminum chloride, and wherein said basic aqueous solution satisfies the following molar ratio formulas:

$$Mg/Al=0.46-0.55;$$

and $$Cl/Al=1.3-3.7.$$

5. The method according to claim 3, wherein said aluminum salt is poly aluminum chloride.

6. A fine alumina-magnesia oxide pulverulent body being made from a basic aqueous solution including an aluminum salt and a magnesium salt in which the total concentration of the aluminum salt and the magnesium salt, which are converted into oxides, is 12–20 WT %, said fine alumina-magnesia oxide pulverulent body, including:

70–73 WT % of an alumina component, which is converted into alumina ($Al_2O_3$); and 27–30 WT % of an magnesia component, which is converted into magnesia (MgO), wherein said fine pulverulent body is formed by pulverizing a hollow alumina-magnesia oxide grain including said alumina component and said magnesia component, and wherein the diameter of said fine pulverulent body is 1 μm or less.

7. The fine alumina-magnesia oxide pulverulent body according to claim 6, wherein the loose bulk density of said pulverulent body is 0.5 g/cm$^3$ or more.

8. The fine alumina-magnesia oxide pulverulent body according to claim 6, wherein said hollow alumina-magnesia oxide grain has an average grain diameter of 10 μm or more.

* * * * *